(12) United States Patent
Ackerschott et al.

(10) Patent No.: US 8,832,937 B2
(45) Date of Patent: Sep. 16, 2014

(54) METHOD FOR STUFFING A MONOLITH WITH A MOUNTING MAT INTO A HOUSING

(71) Applicant: Benteler Automobiltechnik GmbH, Paderborn (DE)

(72) Inventors: Dennis Ackerschott, Paderborn (DE); Roland Ewers, Paderborn (DE); Stefan Merschkötter, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/644,940

(22) Filed: Oct. 4, 2012

(65) Prior Publication Data

US 2013/0086806 A1 Apr. 11, 2013

(30) Foreign Application Priority Data

Oct. 11, 2011 (DE) .......................... 10 2011 115 509

(51) Int. Cl.
*B21D 51/16* (2006.01)
*F01N 3/28* (2006.01)

(52) U.S. Cl.
CPC ........... *F01N 3/2853* (2013.01); *F01N 2450/02* (2013.01)
USPC .......................................................... 29/890

(58) Field of Classification Search
CPC .............. F01N 3/2853; F01N 2450/02; F01N 2013/026; Y02T 10/20; Y02T 10/22
USPC .......................................................... 29/890
See application file for complete search history.

(56) References Cited

U.S. PATENT DOCUMENTS

| 5,096,111 A | 3/1992 | Ishikawa et al. |
| 5,683,660 A | 11/1997 | Wirth et al. |
| 5,755,025 A | 5/1998 | Wirth et al. |
| 5,909,916 A | 6/1999 | Foster et al. |
| 6,405,437 B1 | 6/2002 | Sussmilch et al. |
| 6,793,895 B1 | 9/2004 | Wieres et al. |
| 2003/0000088 A1 | 1/2003 | Mayfield |
| 2008/0201949 A1 | 8/2008 | Kroner |
| 2010/0154215 A1* | 6/2010 | Umeda et al. ................... 29/890 |
| 2010/0225037 A1* | 9/2010 | Adldinger et al. ............ 269/287 |

FOREIGN PATENT DOCUMENTS

| DE | 44 46 896 A1 | 7/1995 |
| DE | 195 49 603 C2 | 12/1995 |
| DE | 198 17 787 A1 | 11/1999 |
| DE | 10 2005 010 267 A1 | 9/2006 |
| DE | 10 2006 046 236 A1 | 4/2008 |
| DE | 10 2006 049 236 A1 | 4/2008 |
| DE | 10 2007 021 493 A1 | 11/2008 |
| EP | 0 480 082 B1 | 12/1994 |
| EP | 0 681 095 B1 | 5/1995 |
| EP | 0 703 354 B1 | 9/1995 |
| EP | 1 015 740 B1 | 12/2002 |
| EP | 1 445 443 B1 | 2/2004 |
| GB | 2 020 190 A | 11/1979 |
| WO | WO 02/095198 A1 | 11/2002 |

* cited by examiner

*Primary Examiner* — David Bryant
*Assistant Examiner* — Moshe Wilensky
(74) *Attorney, Agent, or Firm* — Henry M Feiereisen LLC (57) ABSTRACT

A method for stuffing a monolith wrapped with a mounting mat into a housing includes the steps of radially elastically clamping the housing during stuffing at several locations, and compensating for at least one of a housing tolerance and a housing rotation through an elastic deformation of the housing caused by the clamping.

12 Claims, 6 Drawing Sheets

METHOD FOR STUFFING A MONOLITH WITH A MOUNTING MAT INTO A HOUSING

CROSS-REFERENCES TO RELATED APPLICATIONS

This application claims the priority of German Patent Application, Serial No. 10 2011 115 509.4, filed Oct. 11, 2011, pursuant to 35 U.S.C. 119(a-(d, the content of which is incorporated herein by reference in its entirety as if fully set forth herein.

BACKGROUND OF THE INVENTION

The present invention relates to a method for stuffing a monolith with a mounting mat into a housing, wherein the monolith is wrapped with the mounting mat.

The following discussion of related art is provided to assist the reader in understanding the advantages of the invention, and is not to be construed as an admission that this related art is prior art to this invention.

Catalytic converters and diesel particulate filters typically include a housing in which a catalytic converter or diesel particulate filter is arranged as a monolith. The monolith is usually composed of a filter body, for example made of a ceramic substrate. A mounting mat is placed around the monolith. The mounting mat has a function comparable to a spring. The mounting mat is used to keep the monolith stationary in the housing at different temperatures and under different load conditions. When the mounting mat is a swelling mat, the mounting mat does not swell at cold temperatures. The mounting mat must nevertheless securely hold the monolith. At warm temperatures, the mounting mat usually swells due to the heat more than the housing expands, without causing the forces which act on the monolith to damage the monolith. In addition, the monolith, the mounting mat and the housing must have all the tolerances with respect to size, circumference and/or thickness. The housing diameter is defined within the context of tolerance deviations, as is the diameter of the monolith. Only the mounting mat is able to compensate deviations within the tolerance limits due to its spring effect, but only up to a certain degree. If the mounting mat is compressed too much, meaning overpressed, it is permanently damaged. Ideally, the mounting mat would be compressed only up to its optimum spring action, so as to apply just enough force to hold the monolith in the housing. However, the mounting mat is frequently subjected to substantially higher pressures during stuffing. If lower compression forces could here be applied, the quality and durability of the catalytic converter would be increased, and costs could potentially be reduced by using a thinner mounting mat. Another problem associated with stuffing into a prefabricated housing is that even housings with circular cross-sections do not have a perfect circular cross-section, with deviations from the ideal cross section present within the tolerance variations. The problem is exacerbated when the prefabricated housing has a non-circular cross-section. When the housing and the monolith wrapped in the mounting mat are positioned relative to each other for stuffing, rotation of the housing and/or monolith relative to each other cannot be excluded. Even a slight rotation of 1° to 2° can cause the mounting mat to contact the housing wall at a point of the cross section and thus be sheared during stuffing. Overpressing or shearing of the mounting mat must hence be prevented when the monolith wrapped in the mounting mat is stuffed into the housing, because the lifetime of the catalytic converter and diesel particulate filter would otherwise be reduced. On the other hand, the housing must not be so large that the monolith has play.

It would therefore be desirable and advantageous obviate prior art shortcomings and to provide an improved method for stuffing a monolith wrapped in mounting mat into a predetermined housing a stuffing funnel with the smallest possible error and with the least damage to the catalytic converter or diesel particulate filter.

SUMMARY OF THE INVENTION

According to one aspect of the present invention, a method for stuffing a monolith wrapped with a mounting mat into a housing includes radially elastically clamping the housing during stuffing at several locations, and compensating for at least one of a housing tolerance and a housing rotation through an elastic deformation of the housing caused by the clamping.

With method according to the invention, a monolith wrapped in a mounting mat can be inserted or pressed into a prefabricated housing, without plastically deforming the housing. The housing may be placed on the ground or on a plate, and the monolith wrapped in the mounting mat may be inserted from above. The housing diameter is defined within the context of tolerance deviations, as is the diameter of the monolith.

According to an advantageous feature of the present invention, the monolith with the mounting mat is inserted in the housing by using a stuffing funnel. The contour at a smallest diameter of a stuffing funnel may advantageously be substantially identical to or only slightly smaller than the smallest housing contour (minimum contour) within the permissible tolerance and the monolith wrapped with the mounting mat can be inserted in the housing with the smallest possible error. If the contour at the smallest diameter of the stuffing funnel is significantly smaller than the housing, then the mounting mat surrounding the monolith can be overpressed when passing through the stuffing funnel. This applies in particular to mounting mats having a high area weight which takes up the tolerance. As described above, overpressing damages the mounting mat and reduces the lifetime of the entire catalytic converter or diesel particulate filter. If the housing is smaller than the smallest diameter of the contour on the stuffing funnel, then this causes excessive shearing of the mounting mat, or the monolith wrapped in the mounting mat cannot be correctly inserted in the housing. Rotation of a housing with a non-circular cross section also causes a similar error as using a housing that is too small. In addition, not every housing is made exactly to size, but manufacturing tolerances may occur which differ from the nominal value by a positive or negative mathematical sign. The contour at the smallest diameter of the stuffing funnel must therefore be designed for the smallest housing contour within the tolerance range.

According to another advantageous feature of the present invention, the housing may be clamped at several locations during stuffing, with clamping compensating for a housing tolerance and/or a housing rotation through an elastic deformation. A plastic deformation does not occur; instead, only the elasticity of the housing material is used for adapting the entrance of the housing to the contour of the stuffing funnel. According to another advantageous feature of the present invention, it is thus sufficient to clamp only the entrance area of the housing located directly in front of the stuffing funnel. Once the monolith with the surrounding mounting mat is inserted in the housing, no additional shearing occurs during further insertion into the housing. Instead, the housing can elastically adapt to the monolith with the mounting mat.

Only the actual insertion of the monolith with mounting mat into the housing is problematic. According to another advantageous feature of the present invention, a housing with a circular cross-section is here radially clamped to the nominal contour with at least one clamping segment to compensate for production-related deviations in the cross section by. According to another advantageous feature of the present invention, any shape may be adapted to the contour of the stuffing funnel by elastically clamping in the entrance area of the housing, provided that the contour at the smallest diameter of the stuffing funnel is always designed for the minimum contour, i.e. the smallest housing contour within the tolerance range.

Clamping must then be designed so as to resiliently clamp the housing contour at those pressure points which allow the contour to return to the nominal size in the maximum and minimum ranges. According to another advantageous feature of the present invention, a housing having a non-circular cross-section may be clamped in the region of a smaller radius with a clamping segment conforming to a minimum contour, allowing the housing to expand in the region of larger radius. The regions of smaller and larger radii are here relative in relation to the respective housing.

First, it should be noted that the currently used monolithic shapes that are stuffed typically have radii, wherein angles with sharp edges should be avoided, because sharp edges obstruct stuffing. The housings tend to flatten in the regions having the comparatively greatest radii. This can be compensated by applying pressure on the comparatively smallest radii. The large radii can either freely expand by applying pressure to the smallest radii or the expansion is limited in the region of a large radius by a clamping segment designed for a nominal contour, i.e. for the exact size at this location. As a result, the housing material is elastically displaced toward the intermediate radii. According to another advantageous feature of the present invention, clamping segments may also be provided in the region of the intermediate radii. These clamping segments may then be designed at least for the maximum contour of the housing, i.e. for a housing contour with the greatest tolerance deviation. If necessary, these clamping segments support the elastic housing deformation toward an ideal contour. According to another advantageous feature of the present invention, it may be sufficient to form the camping segments in the region of the intermediate and/or the large radii only as a counter support or a stop.

According to another advantageous feature of the present invention, an oval cross-section according to the invention can be adapted by clamping. It is hereby sufficient to clamp with four clamping segments, wherein the first two of the four clamping segments may be designed for the minimum contour of the housing at a smallest radius of the ideal cross-section, i.e. the nominal cross-section. The second two of the four clamping segments may be designed for the nominal contour of the housing at a large radius of the nominal cross-section. To improve insertion, the smallest diameter of the stuffing funnel may correspond to the smallest diameter of the housing within the tolerance range or may be only slightly smaller.

By designing the first two clamping segments for a minimum circumferential contour, it is ensured that each housing is only compressed through elastic deformation at these locations to the minimally required width even with a small rotation, wherein the housing contour expands at those locations that are not clamped. Clamping with the second two clamping segments at the large radius of the nominal cross-section to a nominal contour supports an elastic displacement of the housing material into the regions with intermediate radii. Clamping at those four housing locations is sufficient, in particular with an oval cross section. An oval cross-section can hereby be readily clamped by using a conventional wedge press.

According to another advantageous feature of the present invention, clamping may be performed with a conventional radial press. Advantageously, the clamping segments may hereby move in slots, so that the clamping segments can move both inwardly and outwardly when the radial press rotates. According to another advantageous feature of the present invention, a slope in the slot approaches zero at the press stop. In this way, the return force exerted on a cylinder of the press performing the rotary motion is minimized at the press stop. According to another advantageous feature of the present invention, because both the contour should be elastically clamped so as to conform as closely as possible to the nominal size and a housing rotation should be compensated, a counter support used for supporting the housing during the stuffing operation may be supported for rotation. The counter support can then follow a compensating rotation of the housing.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
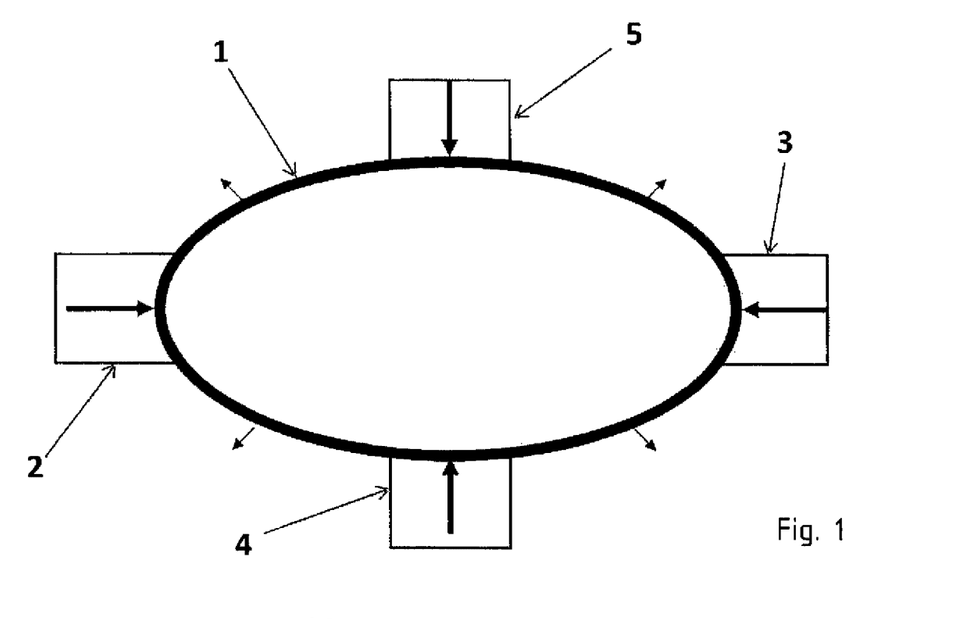
FIG. 1 is an oval housing with four clamping segments.

Turning now to the drawing, and in particular to FIG. 1, there is shown a clamping situation for an oval housing 1. The housing 1 is elastically clamped by clamping segments 2 and 3 to a minimum contour in the direction of the arrow at the smallest relative radius of the housing 1. The clamping segments 4 and 5 are designed for a nominal size and clamp the housing 1 in the direction of the arrow elastically to the nominal size at the largest relative radius of the housing 1. The intermediate radii of the housing 1 are then elastically displaced outwardly in the direction of the arrow, thereby counteracting flattening of the housing 1.

Figure 2:
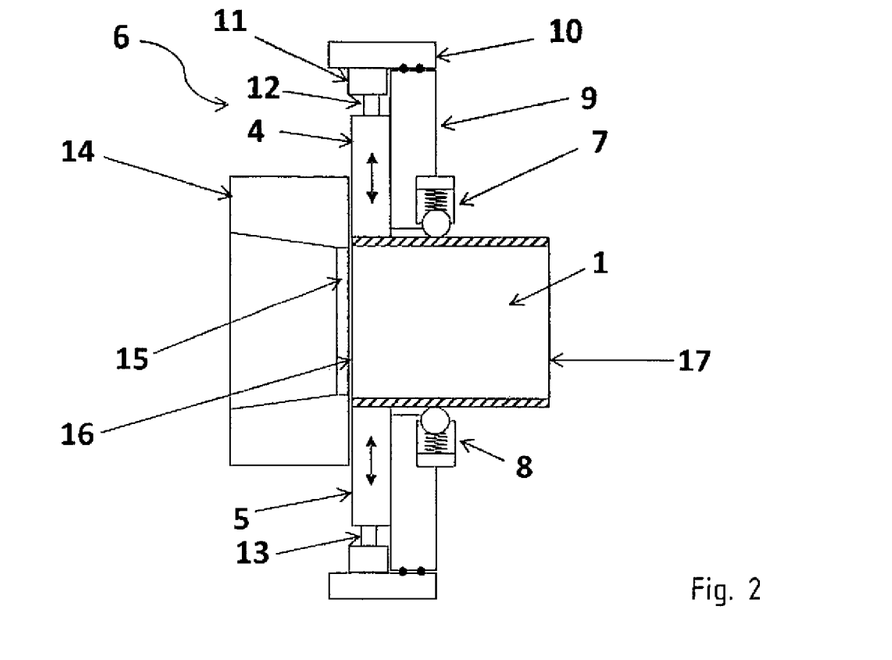
FIG. 2 is a schematic cross-sectional diagram of an apparatus for performing the method according to the invention.

FIG. 2 shows in cross-section a schematic clamping device 6 for carrying out the method according to the invention. The housing 1 is illustrated in a longitudinal section. The housing 1 passes through positioning rollers 7, 8 upon insertion into the clamping device 6. The positioning rollers 7, 8 are used to ensure a most accurate insertion of the housing 1 into the clamping device 6. Slight rotations of several degrees, however, can nevertheless not be prevented, because an unillustrated feed device may be unable to insert the housing with sufficient accuracy into the clamping device 6 in spite of the positioning rollers 7, 8. The positioning rollers 7, 8 are attached to a base plate 9 by way of springs. The base plate 9 is in turn connected with a rotationally supported adjusting ring 10. The adjusting ring 10 exerts via a wedge plate 11 and rollers 12, 13 a force on the clamping segments 4, 5, causing the clamping segments 4, 5 to transfer damping forces to the housing 1. The clamping segments 4, 5 can hereby be moved by the adjusting ring 10 both inwardly and outwardly. A stuffing funnel 14 is arranged directly in front of the clamping device 6. The front face of the housing 1 contacts a smallest diameter 15 of the stuffing funnel 14. The contour at the smallest diameter 15 of the stuffing funnel 14 is only slightly smaller than the contour at the front face 16 of the housing 1. Clamping the housing 1 with the clamping device 6 according to the invention ensures that the contour of the housing 1 approaches the ideal contour, so that an (unillustrated) monolith wrapped with a mounting mat, which is stuffed with the stuffing funnel 14 into the housing 1, is prevented from contacting an front-face housing edge of the housing 1 at any location of the front face 16 of the housing 1. In this way, the contour of the stuffing funnel 14 can according to the invention correspond at its smallest diameter 15 to the front-face contour 16 of the housing 1 or be only slightly smaller. This minimizes overpressing of the mounting mat wrapped around the monolith when passing the smallest diameter 15 on the stuffing funnel 14. Optionally, a thinner mounting mat can be used. An unillustrated counter support engages with the rear side 17 of the housing 1 during the stuffing operation and holds the housing 1 in position against the stuffing forces. To compensate for a housing rotation with the method according to the invention, the counter support is according to the invention supported for rotation so as to follow, or at least not counteract, a rotary motion of the housing 1 during insertion or clamping.

Figures 3, 4:
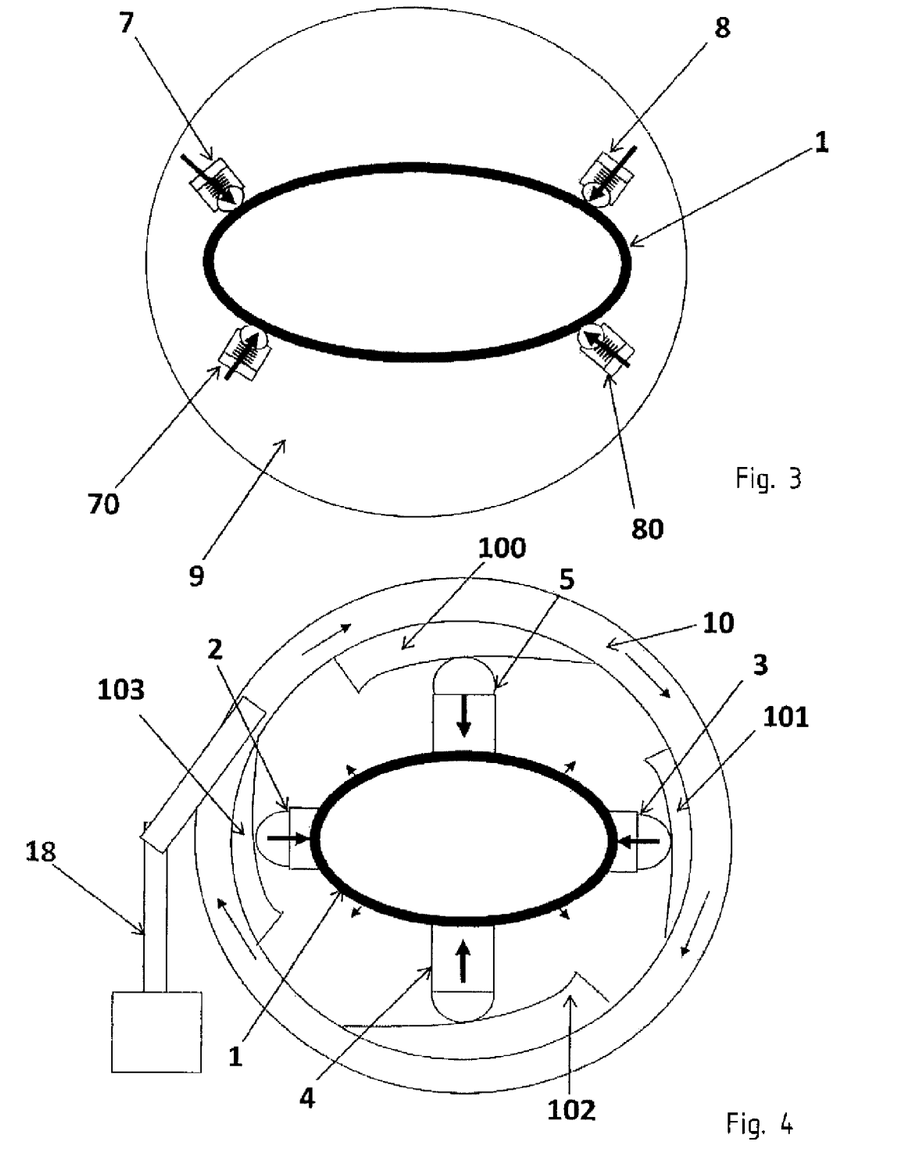
FIG. 3 is a schematic diagram of insertion of the housing.
FIG. 4 is a schematic diagram of clamping of the housing.

FIG. 3 shows schematically insertion of the housing 1 into the clamping device 6. The positioning rollers 7, 8, 70, 80 apply a spring force to the housing 1, causing the housing to rotate into an insertion position. However, smallest rotations of 1° to 2° cannot be prevented. Rotations of 1° to 2° are unimportant at the smallest radii of the housing 1; however, the effects of these rotations increase for the intermediate radii, so that these small rotations may cause the mounting mat to shear at the front face of the housing 1.

FIG. 4 shows a schematic diagram of elastic clamping of the housing 1 by way of the adjusting ring 10. The adjusting ring 10 is driven by a cylinder 18 and has wedges 100, 101, 102, 103 formed on the inside and capable of moving clamping segments 2, 3, 4, 5 inward during a rotation. A force is hereby applied to the clamping segments 2 and 3 at the smallest radii of the housing 1, clamping the housing 1 to conform to the minimum contour. Conversely, the clamping segments 4 and 5 at the largest radii of the housing 1 are designed only as counter support for limiting elastic expansion of the housing 1 to the nominal size. The housing contour is then displaced in the direction of the intermediate radii, so that the housing 1 overall approaches the nominal size as closely as possible; however, the housing 1 is always adjusted at the front-face contour at least to the minimum contour.

Figure 5:
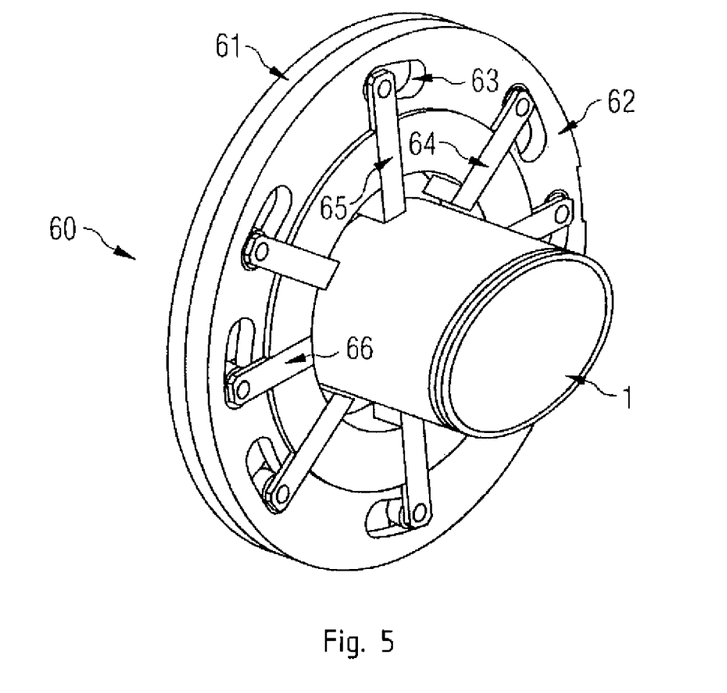
FIG. 5 is a part of a radial press.

FIG. 5 shows a part 60 of an additional radial press. The part 60 is composed of a guide plate 61 and a rotatably supported adjusting ring 62. The adjusting ring 62 has slots 63, which can be moved by the eight clamping segments 64, 65, 66 through a rotation of the adjusting ring 62. The oval housing 1 is clamped by the clamping segments 64, 65, 66. A first clamping segment 66 applies a clamping force on the housing 1, whereas a second clamping segment 65 with a relative offset of 90° at least contacts the housing 1. A third clamping segment 64 having an offset of 45° relative to the second clamping segment 65 is spaced from the housing 1 and is designed to have at least the maximum contour of the housing 1. In accordance with a further preferred embodiment of the invention, this may be sufficient to design the second clamping segments 65 only as a stop or counter supports.

Figure 6:
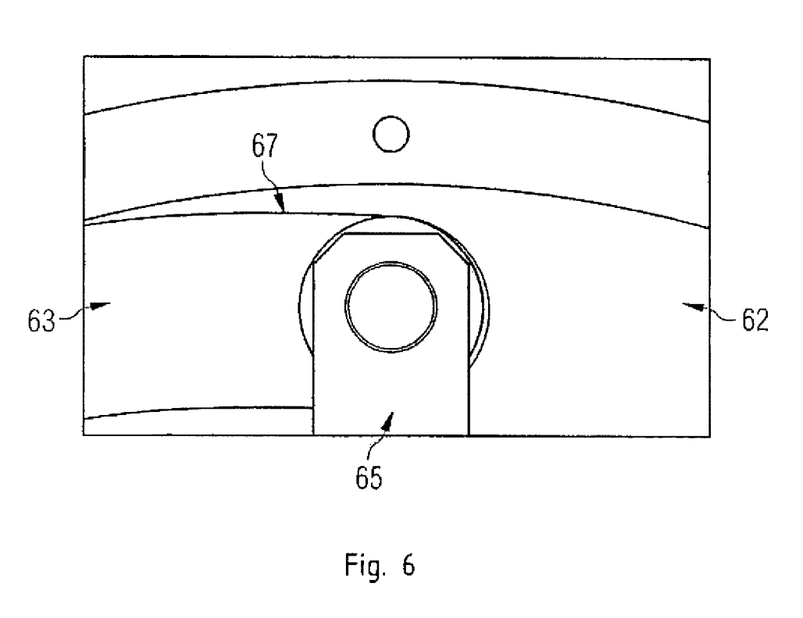
FIG. 6 is a detail of a slot in which a clamping segment is guided.

FIG. 6 shows the slot 63 in detail. The clamping segment 65 is moved in the slot 63 to the press stop. According to the invention, a slope 67 along the slot 63 approaches zero at the press stop. The unillustrated cylinder thus does not need to work against a restoring force.

Figure 7:
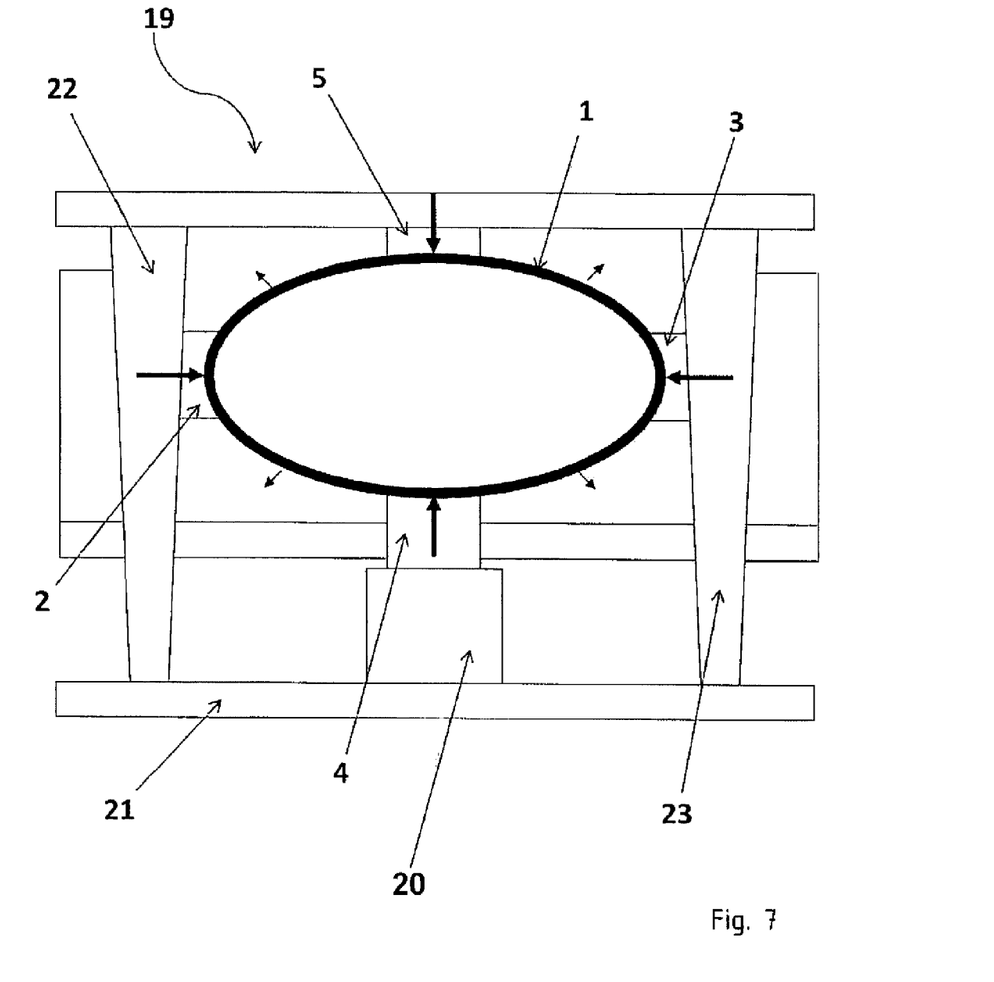
FIG. 7 is a schematic diagram of a wedge press for performing the method according to the invention.

FIG. 7 shows a schematic wedge press 19 for performing the inventive method. The housing 1 is again radially clamped via the clamping segments 2, 3, 4, 5, with the clamping segments 2 and 3 generating the actual clamping forces for the minimum contour, whereas the clamping segments 4 and 5 are designed as counter supports for the nominal size. A cylinder 20 moves the clamping segment 4 upward and moves a wedge frame 21 downward. The wedge frame 21 presses the clamping segment 5 downward and presses the clamping segments 2 and 3 inward with the lateral wedges 22, 23. The housing 1 is clamped radially and is displaced in the free regions toward the maximum contour.

Figure 8:
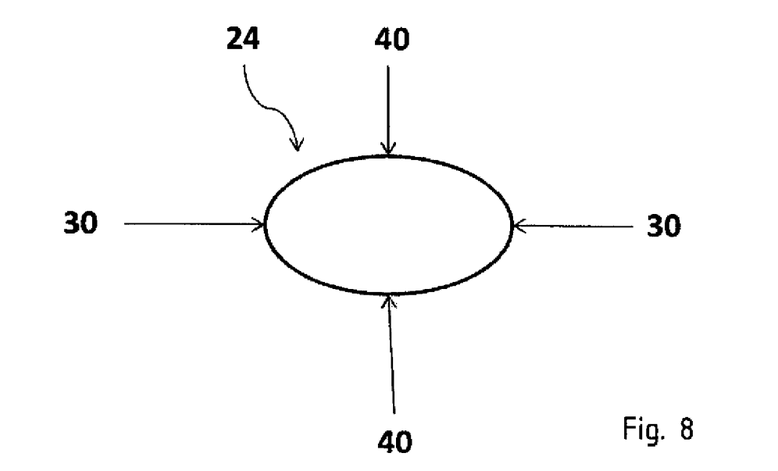
FIGS. 8 to 11 show various cross-sectional shapes of a housing.

FIGS. 8 to 11 show various cross-sections 24, 25, 26, 27 of monoliths and thus also different housing cross-sections 24, 25, 26, 27 which have allowances for the mounting mat. FIG. 8 shows here the oval cross section 24 already mentioned several times. According to the invention, this cross-section 24 is clamped during the stuffing operation at the locations 30 to conform to the minimum contour. The oval housing 24 is clamped at the locations 40 to conform to the nominal contour during the stuffing operation.

Figure 9:
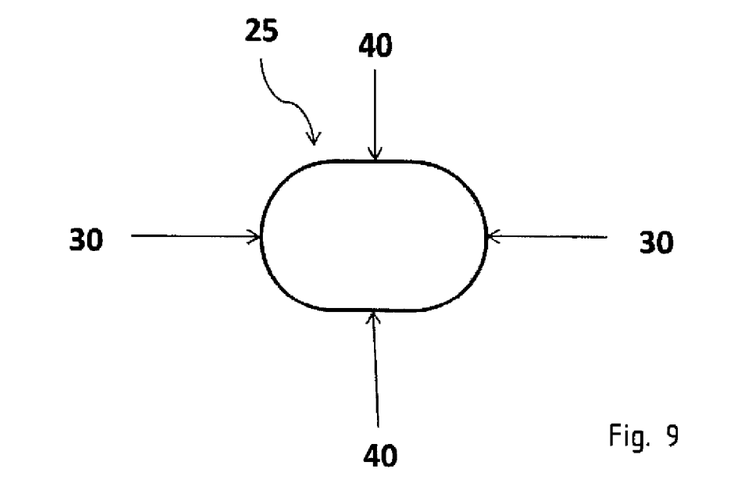

FIG. 9 shows in cross-section 25 a rectangle with strongly rounded corners. This housing 25 is clamped at the locations 30 to conform to the minimum contour during the stuffing operation. The housing 25 is clamped at the locations 40 to conform to the nominal contour during the stuffing operation.

Figure 10:
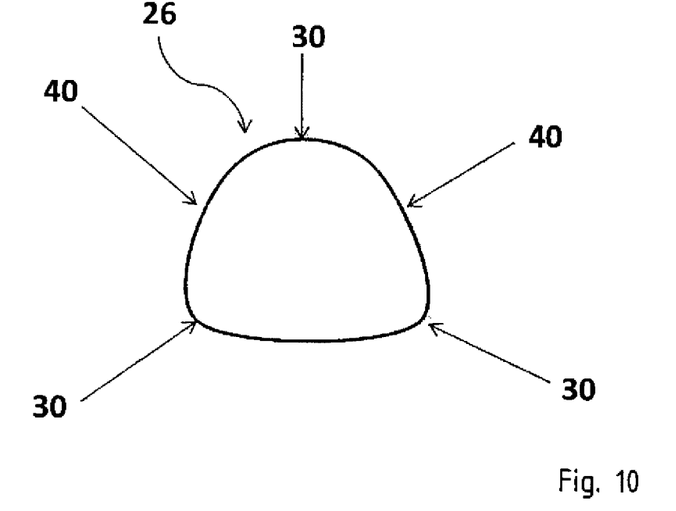

FIG. 10 shows a trapezoidal cross-section 26 with strongly rounded corners. This trapezoidal cross-section 26 is clamped at the locations 30 to conform to the minimum contour during the stuffing operation. The housing 26 is clamped at the locations 40 to conform to the nominal contour during the stuffing operation.

Figure 11:
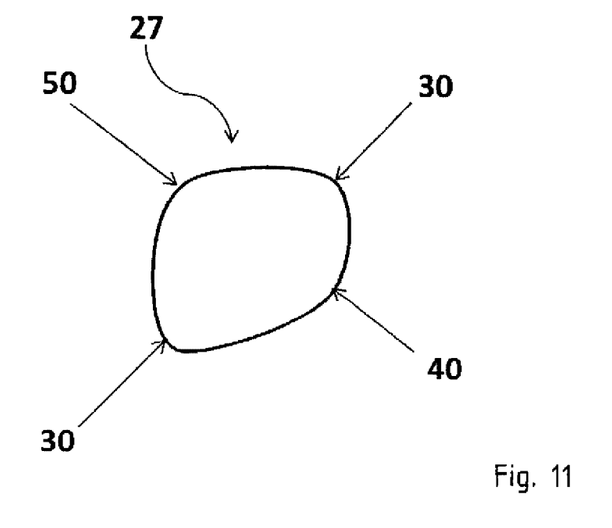

FIG. 11 shows an approximately potato-shaped cross-section 27. This potato-shaped cross-section 27 is clamped at the locations 30 to conform to the minimum contour during the stuffing operation. The housing 27 is clamped at the locations 40 to conform to the nominal contour during the stuffing operation. The housing 27 is clamped at the location 50 to conform either to the minimum contour or to the nominal contour.

According to the invention, all these cross sections 24, 25, 26, 27 are elastically clamped radially in the region of a smaller radius to the minimum contour, whereas the housing is able to expand at least to the nominal size in the region of a larger or an intermediate radius.

What is claimed is:

1. A method for stuffing a monolith wrapped with a mounting mat into a housing, comprising the steps of:
radially elastically clamping the housing during stuffing only in an entrance area of the housing disposed directly before a stuffing funnel,
elastically deforming the entrance area of the housing so as to match a contour of the stuffing funnel, without causing plastic deformation of the entrance area of the housing,
inserting the monolith in the elastically deformed entrance area of the housing, and
removing the elastic clamping of the entrance area of the housing, thereby conforming the entrance area to a contour of the monolith and compensating for at least one of a production-related housing tolerance and a housing rotation.

2. The method of claim 1, wherein the housing has a circular cross section and the housing is radially clamped with at least one clamping segment to conform to a nominal contour.

3. The method of claim 1, wherein the housing is clamped by a radial press.

4. The method of claim 3, wherein the radial press comprises clamping segments moved in slots.

5. The method of claim 4, wherein a slope in a slot approaches zero at a stop of the radial press so as to minimize a return force on a cylinder of the radial press.

6. A method for stuffing a monolith wrapped with a mounting mat into a housing, comprising the steps of:
radially elastically clamping the housing at several locations during stuffing, and
compensating for at least one of a housing tolerance and a housing rotation through an elastic deformation of the housing caused by the clamping,
wherein the housing has a non-circular cross section and the housing is additionally radially clamped with a clamping segment in a region of a smaller radius to conform to a minimum contour, while the housing is expanded in a region having a larger radius in relation to the smaller radius.

7. The method of claim 6, wherein an additional clamping segment is applied in a region of the larger radius, with the additional clamping segment being designed for a nominal contour in the region of the larger radius.

8. The method of claim 6, wherein an additional clamping segment is applied in a region of an intermediate radius, with the clamping segment being designed at least for a maximum contour in the region of the intermediate radius.

9. The method of claim 8, wherein the additional clamping segment is formed as a counter-support or a stop in the region of at least one of the intermediate radius and the larger radius.

10. The method for housing a monolith of claim 9, wherein a counter-support for holding the housing during the stuffing operation is rotatably supported.

11. The method of claim 6, wherein the housing has an oval cross-section.

12. The method of claim 11, wherein the housing is peripherally clamped by four clamping segments, wherein two of the four clamping segments at a smallest radius of the nominal cross-section are designed for the minimum contour of the housing and other two of the four clamping segments at a larger radius of the nominal cross-section are designed for a nominal contour of the housing.

* * * * *